(12) United States Patent
Cognet et al.

(10) Patent No.: US 7,080,160 B2
(45) Date of Patent: Jul. 18, 2006

(54) METHOD FOR CREATING ACCURATE TIME-STAMPED FRAMES SENT BETWEEN COMPUTERS VIA A NETWORK

(75) Inventors: Yves Cognet, Versailles (FR); Joseph Ovanesian, Simi Valley, CA (US); Armen Aynillan, Simi Valley, CA (US)

(73) Assignee: Qosmetrics, Inc., Camarillo, CA (US)

( * ) Notice: Subject to any disclaimer, the term of this patent is extended or adjusted under 35 U.S.C. 154(b) by 657 days.

(21) Appl. No.: 09/996,490

(22) Filed: Nov. 28, 2001

(65) Prior Publication Data

US 2002/0073228 A1 Jun. 13, 2002

Related U.S. Application Data

(63) Continuation-in-part of application No. 09/727,377, filed on Nov. 28, 2000, now Pat. No. 6,801,505.

(30) Foreign Application Priority Data

Apr. 27, 2000 (FR) .................................. 00 05366

(51) Int. Cl.
*G06F 15/16* (2006.01)
(52) U.S. Cl. ..................... 709/248; 709/228; 709/233
(58) Field of Classification Search ................ 709/202, 709/203, 205, 224, 227, 228, 233, 248
See application file for complete search history.

(56) References Cited

U.S. PATENT DOCUMENTS

| | | | |
|---|---|---|---|
| 5,504,878 A * | 4/1996 | Coscarella et al. ......... 709/248 |
| 5,964,846 A * | 10/1999 | Berry et al. ................ 713/375 |
| 6,173,207 B1 * | 1/2001 | Eidson ........................ 700/14 |
| 6,233,238 B1 * | 5/2001 | Romanowski et al. ...... 370/389 |
| 6,389,547 B1 * | 5/2002 | James et al. ................ 713/400 |
| 6,473,832 B1 * | 10/2002 | Ramagopal et al. ........ 711/118 |
| 6,735,223 B1 * | 5/2004 | Woo et al. .................. 370/516 |
| 6,831,892 B1 * | 12/2004 | Robinett et al. ............ 370/232 |
| 2004/0015582 A1 * | 1/2004 | Pruthi ........................ 709/224 |

\* cited by examiner

*Primary Examiner*—Ario Etienne
*Assistant Examiner*—Sargon Nano
(74) *Attorney, Agent, or Firm*—Kelly Lowry & Kelley, LLP

(57) ABSTRACT

A method for creating time-stamped frames sent between computers includes receiving and generating a universal coordinated time reference signal using a global positioning system. Clocks independent of operating systems of the sending and receiving computer are synchronized with the reference signal. A test frame is created including a tag having reserved fields for transmit and receive time stamps. The transmit time stamp is inserted into the reserved transmit time stamp field, without intervention of the sending computers central processing unit, that corresponds to the time on the synchronized clock at the instant the test frame is sent. The test frame having the transmit time stamp is received by the receiving computer, and a receive time stamp is inserted into the reserved receive time stamp field corresponding to the time on the synchronized clock of the receiving computer when the test frame was received.

28 Claims, 6 Drawing Sheets

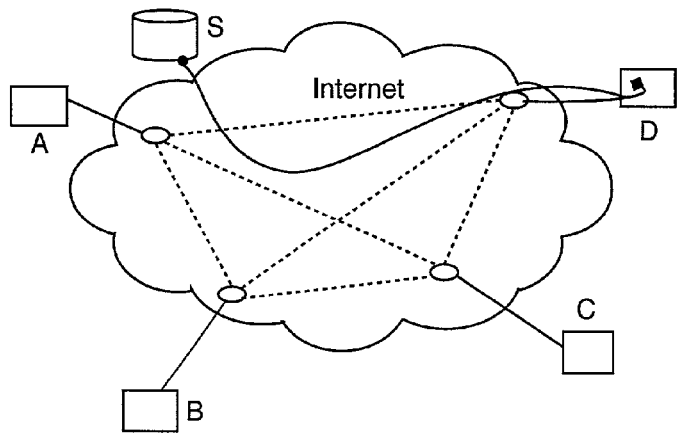
FIG. 1
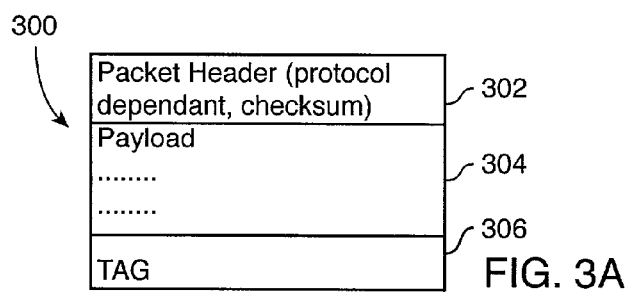
FIG. 3A
| Source IP Address | | | 306 |
|---|---|---|---|
| Destination IP Address | | | |
| Scenario ID | | | |
| Test-Cfg-ID | Rx CSC ID | Tx/Rx OPCODE | |
| Sepquence NO | Sequence No Comp | | |
| One Way Latency | | | |
| Rx UTC Time (In seconds) | | | |
| ~Rx UTC Time Comp. | | | |
| Rx UTC Time Frac. (Fraction of 1 sec.) | | | |
| ~Rx UTC Time Frac. Comp | | | |
| Tx UTC Time (In seconds) | | | |
| ~Tx UTC Time Comp | | | |
| Tx Time Frac. (Fraction of 1 Sec.) | | | |
| ~Tx Time Frac. Comp | | | |
FIG. 3B

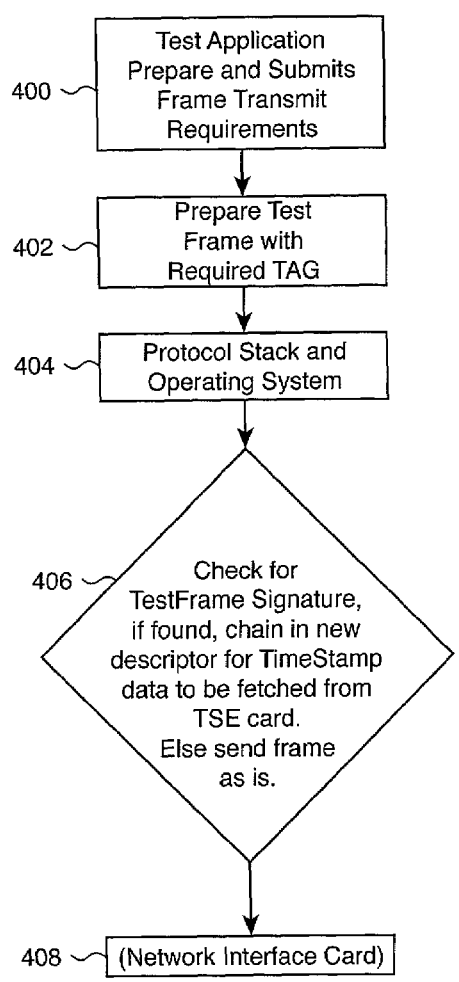
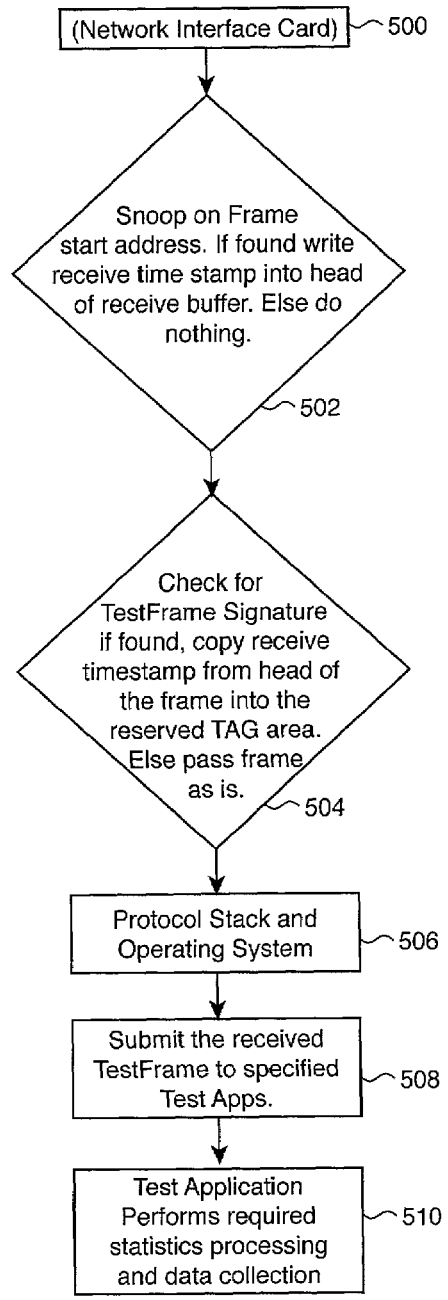
FIG. 4
FIG. 5

METHOD FOR CREATING ACCURATE TIME-STAMPED FRAMES SENT BETWEEN COMPUTERS VIA A NETWORK

RELATED APPLICATION

This application is a continuation-in-part of U.S. application Ser. No. 09/727,377, filed Nov. 28, 2000 now U.S. Pat. No. 6,801,505.

BACKGROUND OF THE INVENTION

The present invention generally relates to a method of using computer equipment to send time-stamped frames. More particularly, the present invention relates to a method of inserting a transmit time stamp of a test frame representing a reference time signal indicating the time when the test frame is shifted onto the outgoing network wire, and inserting a received time stamp corresponding to the reference signal time when the test frame is received by a receiving computer, independent of the operating system clocks of the sending and receiving computers, to provide more accurate timing measurement services.

It is known to make use of special time-stamped frames for measuring the time required for transfer between a piece of equipment to which it is connected, e.g. by a communications network, and in particular the Internet. In known techniques, the time stamp of such a frame corresponds to the instant at which the test frame was generated. Frames generated under such conditions do not enable transmission time to be measured accurately, and in any event transmission time is defined in standards as the time between the last bit of the frame being sent and the first bit of the frame being received by the remote equipment.

In the present state of the network performance, e.g. Internet performance, this lack of accuracy is without consequence since the transmission time being measured can be as long as several hundreds of milliseconds, or even several seconds. Nevertheless, there is a very clear trend at present towards higher data rate networks and towards the creation of services in which transmission time is guaranteed, and this makes it necessary to have a higher performance measurement tool for quality control of high quality services.

The standard timescale used by most nations of the world is the Universal Coordinated Time or UTC, which is based on the Earth's rotation about its axis. The Gregorian calendar, which is commonly used to represent UTC time, is based on the Earth's rotation about the Sun. The UTC timescale is disciplined with respect to International Atomic Time (TAI) by inserting leap seconds at intervals of about 18 months.

UTC time information is disseminated and broadcasted by various means, including radio, satellite navigation systems (GPS) as well as telephone modems. GPS is the most accurate way to get several computers in sync with UTC. GPS are used to reduce offset between UTC and the system time.

For reasons of convenience, it is not possible to equip every computer with one of these GPS receivers. However, it is possible to equip some number of computers acting as timeservers to synchronize a much larger number of remote clients connected by a common network. In order to do this, a distributed network clock synchronization protocol is required which can read a server clock, transmit the reading to one or more clients and adjust each client clock as required. Protocol that does this includes the Network Time Protocol (NTP). The relation between the clients and the servers is sometimes referred as an NTP tree where the clients are the leaves, the root is a server and all the intermediate nodes are client or server.

Such protocol works on the client server model, where, on request, the server sends a message including its current clock value. Upon arrival, the client adds its own timestamp but the client needs also to measure the propagation delay from the server in order to determine its clock offset relative to the server. Since it is not possible to determine the one-way delays, unless the actual clock offset is known, the protocol measures the total round trip delay and assumes the propagation times are statistically equal in each direction. In general, this is a useful approximation, however, in the Internet of today, network paths and the associated delays can differ significantly due to the individual service providers.

Computers include a quartz resonator-stabilized oscillator and hardware counter that interrupt the processor at intervals of a few milliseconds. At each interrupt, a quantity called tick is added to a system variable representing the clock time. This clock can be read by system and application programs. Once set, the clock readings increment at a nominal rate, depending on the value of tick. Typical system kernels provide a programmable mechanism to increase or decrease the value of tick by a small, fixed amount in order to amortize a given time adjustment smoothly over multiple tick intervals. Such mechanisms are often based on an interrupt coming from a counter. A companion chip to the central processing unit (CPU) is also needed in order to initialize the system variable with the time of day value when the system is powered on. This chipset, called Real Time Clock, works in conjunction with a quartz and a battery in order to maintain and increase the time of day information up to date even when the system is not powered. This jiffy or system clock resolution is typically around 10 milliseconds.

Clock errors are due to variations in network delay and latencies in computer hardware and software (jitter), as well as clock oscillator instability (wander).

The time of a client relative to its server can be expressed $$T(t)=T(t_0)+R(t-t_0)+\tfrac{1}{2}D(t-T_0)^2,$$

where t is the current time, T is the time offset at the last measurement update $t_0$, R is the frequency offset and D is the drift due to resonator aging. All three terms include systematic offsets that can be corrected and random variations that cannot. NTP estimates the first two terms. Errors due to the third term, while important to model resonator aging in precision applications, are neglected, since they are usually dominated by errors in the first two terms. The synchronization protocol estimates $T(t_0)$ and $R(t_0)$ at regular intervals and adjusts the clock to minimize T(t) in future. In common cases, R can have systematic offsets of several hundred parts-per-million (PPM) with random variations of several PPM due to ambient temperature changes. If not corrected, the resulting errors can accumulate to seconds per day. In order that these errors do not exceed a nominal specification, the protocol must periodically re-estimate T and R and compensate for variations by adjusting the clock at regular intervals. As a practical matter, for nominal accuracies of tens of milliseconds, this requires clients to exchange messages with servers at intervals in the order of tens of minutes.

Analysis of quartz-resonator stabilized oscillators show that errors are a function of the averaging time, which in turn depends on the interval between corrections. At correction intervals less than a few hundred seconds, errors are dominated by jitter, while, at intervals greater than this, errors are dominated by wander. These errors accumulate at each NTP level from the root to the leaves of the tree. It is possible to quantify these errors by statistical means, so does NTP.

NTP protocol carries several approximations that can result in errors that are at a level of magnitude far above the resolution even if it has been shown that the worst-case error in reading a remote server clock cannot exceed one-half the round trip delay measured by the client. Time correction techniques, such as NTP, are based on an approximation of the one way delay by sampling the round trip delay and by assuming that the round trip delay is twice the one way delay. Although this might not be true, another hidden inaccuracy comes from the fact that the time stamp that is carried by an NTP frame for example doesn't carry the wire time stamp. When the application (NTP in this case), reads the system time and stamps the frame to be sent with this value, then this frame is queued in the driver memory space and then the driver will send this frame over the network. Between the time the time stamp is affixed to the frame and the time the frame is sent, several things might occur that adds some erratic delays. Such delays may come from other running tasks that cause a kernel memory swap. Real time kernel may avoid these erratic delays by giving to this task the highest priority.

In order to avoid NTP erratic behaviors, GPS or radio clock can be used. But as long as the measurement relies on a software time stamping algorithm that doesn't match accurately the wire time, the accuracy of the measure will be bounded by key approximations. Amongst the most critical ones are:

Non real time kernel has a behavior that creates hidden time drift due to task time slicing, context switching or cache misses.

Even with real time kernel, the frame sending process is lasting some processor cycles and more ever, on an Internet network, an ARP request/response may be sent if the physical address of the destination node is not within the ARP cache.

In either case, kernel buffering is adding delays. Once the time stamp has been added to the frame, the frame is buffered in the I/O driver transmit queue.

All software optimization techniques aimed at improving the system time resolution, even used in conjunction with a GPS that allows a better synchronization to UTC, don't lead to an overall good accuracy. With the increased speed of today and tomorrow's network, parameters that have been ignored or approximated in the past, will become more and more critical.

Accordingly, there is a continuing need for a technique of improving the accuracy of timing measurement services that measure the time required for transfer between a piece of computer equipment and a remote piece of equipment which are connected by a communications network. The present invention fulfills this need and provides other related advantages.

SUMMARY OF THE INVENTION

The present invention resides in a method for creating accurate time-stamped frames sent between computers connected via a network, such as the Internet. The method generally comprises the steps of first generating a time reference signal, and synchronizing clocks associated with sending and receiving computers with the time reference signal. A test frame is created that includes a tag having reserved fields for transmit and receive time stamps. A transmit time stamp is inserted into the reserved transmit time stamp field, corresponding to the time on the synchronized clock of the sending computer at the instant the test frame is sent on to the network. The test frame having the transmit time stamp is received by the receiving computer and a receive time stamp is inserted into the reserved received time stamp field, corresponding to the time on the synchronized clock of the receiving computer when the test frame was received by the receiving computer.

In a particularly preferred embodiment, a global positioning system receiver in communication with either the sending or receiving computer receives a universal coordinated time signal in order to generate the reference signal. Typically, the clock and global positioning system receivers are electronically connected on a device, such as a card interfacing with a multi-master bus of the receiving or sending computer. The clocks are initialized with the received universal coordinated time signal, and over time the universal coordinated time signal is tracked and averaged periodically and the clock adjusted to correspond the universal coordinated time signal. The clock is adjusted by altering the voltage applied to a voltage controlled crystal oscillator associated with the clock to maintain synchronization with the universal time signal. Due to the fact that the clock operates independent of the operating system clock within the sending or receiving computer, the synchronized clocks have a resolution of between 10 and 100 nanoseconds.

The original test frame and tag are created by software residing in the sending computer. The tag originally includes complimentary time information in the reserved transmit and received time stamp fields which enables the insertion of the synchronized transmit and receive time stamps upon transmit and receipt, respectively, and also allows transport protocol checksum neutrality otherwise referred to as transparency. As the test frame is being sent on to the network, the transmit time stamp replaces the complimentary transmit time information in the transmit time stamp fields automatically for each test frame without intervention of the sending computer's central processing unit. This avoids the delays commonly encountered in previous methods, and provides nearly instantaneous time stamping as the test frame is sent on to the network wire.

There are two methods of attaching a received time stamp corresponding to the synchronized time that the test frame was received by the receiving computer. In the first method, the pertinent components of the invention snoop and look for the start of receive frame buffer addresses on the multimaster bus. The receiving computer automatically attaches a received time stamp corresponding to the synchronized time that the frame was received for not only the test frames, but each frame received by the receiving computer. In the other method, the receiving computer detects the tag of each test frame and attaches a received time stamp corresponding to the synchronized time that the frame was received to only the test frames. In either case, the receiving computer may temporarily store the received time stamps in a register of first in first out (FIFO), and write them onto the reserved area of the corresponding head of the receive frame buffer. This allows the nearly exact time, according to the internal error of the synchronized clock, that the test frames were received to be associated with the appropriate test frame, even if this is performed after receipt.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a schematic illustration showing how the invention can be implemented in the context of an Internet-type network;

FIG. 3A is a representation of a test frame used in accordance with the present invention;

FIG. 3B is a representation of the contents of a TAG portion of the test frame of FIG. 3A;

FIG. 4 is a flow chart illustrating the steps taken in preparing and transmitting a test frame in accordance with the present invention;

FIG. 5 is a flow chart depicting the steps taken in receiving a test frame in accordance with one embodiment of the present invention;

DETAILED DESCRIPTION OF THE PREFERRED EMBODIMENT

Figure 2:
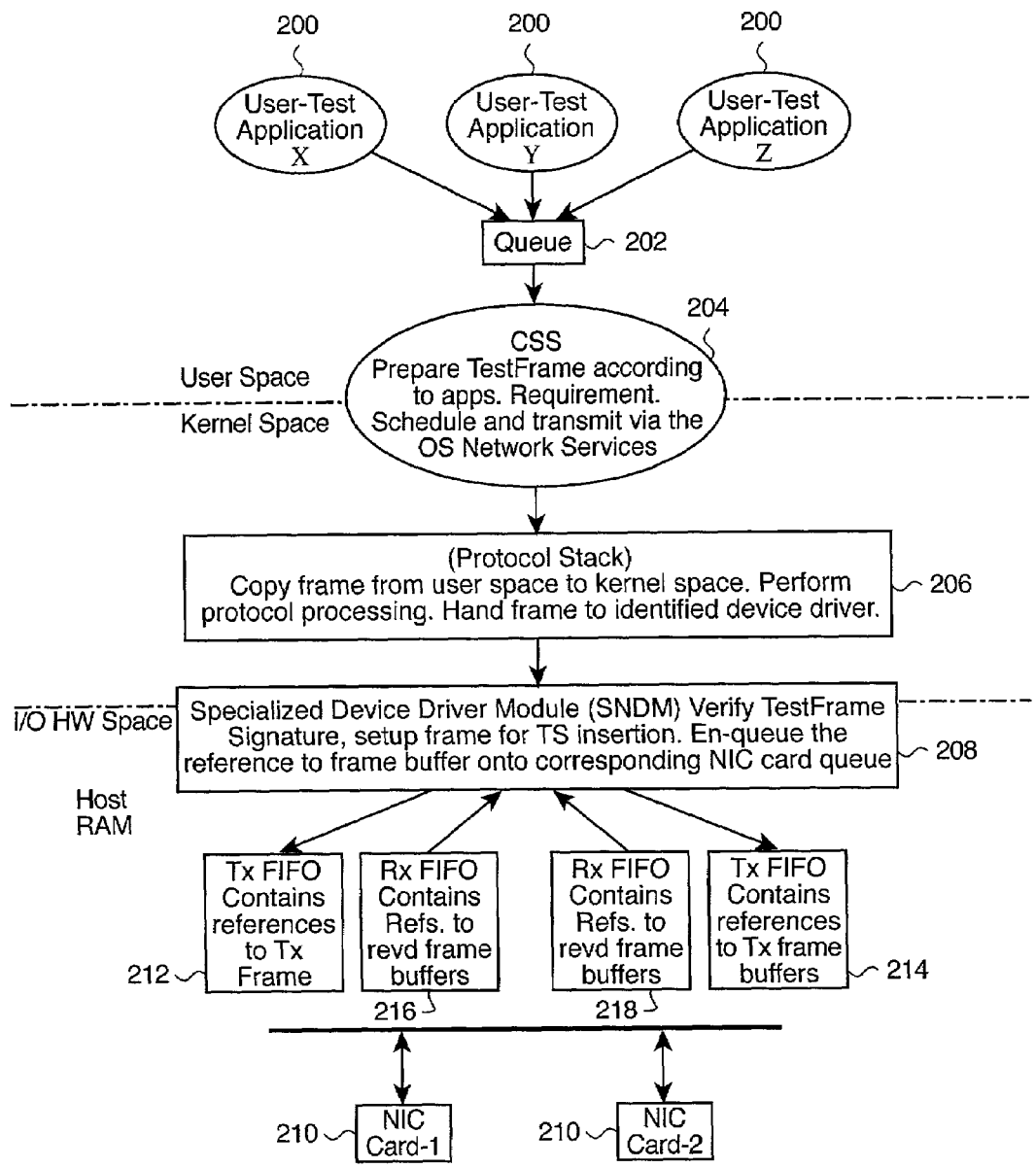
FIG. 2 is a functional block diagram depicting how the invention interacts with various components of a computer, in accordance with the present invention.

As shown in the accompanying drawings for purposes of illustration, the present invention pertains to an apparatus and method for appending accurate time stamps to specific frames being sent among cooperating dedicated computer systems connected via WAN, MAN or LAN networks. With reference to FIG. 1, a schematic is given as an example where A, B, C and D are computers interconnected by a network connection, such as the Internet, and having another computer S used to collect the information measured by A, B, C and D. One will note that the apparatus and method described hereafter is transparent to the protocols (IP/UDP, TCP, RTP, RTCP or others) utilized by various applications. The time-stamped frames transmitted over the networks are then used by the corresponding software applications for accurate network transmission delayed measurements.

The present invention also pertains to a method for providing an accurate time stamp to specific frames, using standard systems services by the kernel specific services or protocol specific services in a transparent way. In the presented implementation, the present invention takes advantage of the features of a PCI bus of the involved computer systems for providing transmit-receive time stamps. However, it can also work with other system, back-plane or peripheral bus technologies that support similar bus mastering features. The outcome of this invention is to provide accurate time-stamps to application test frame utilizing "commercial off the shelf" network cards that have not been specifically designed for this purpose. The apparatus and method will enforce the precision to a high level of accuracy by providing UTC time stamps representing the last bit on the wire on the transmit side, and the first bit off the wire on the receive side, while maintaining absolute time reference to UTC time through the use of an integrated GPS, as described more specifically herein.

The invention comprises several elements, including Controlling System Software (CSS), a specific hardware called the time stamp engine (TSE), and a special firmware residing in network drivers which utilize the TSE for test frame time-stamp processing, and a standardized test frame format. The invention is implemented onto traditional computer systems having a mother board with a CPU, RAM, and a disk drive with an operating, or kernel, system and stand alone network interfacing cards (NIC). A typical system configuration would consist of the TSE component of the invention along with the NIC cards fitted within the mother board (computer system) via the PCI bus, and a flash disk or a standard disk drive connected to the main board. Upon power up, the specialized network driver firmware is loaded and initialized, and the controlling system software is executed on the main host CPU. A typical network test scenario will consist of a network, such as the Internet, two or more computer test systems each equipped with the invention and connected to the network through the NIC cards.

With reference to FIG. 2, the test applications software 200 running on board the host CPU interfaces with the controlling system software (CSS) of the invention via a predefined operating system cue 202 mechanism. Each test application will create its own unique frame to be transmitted among its various peer entities executing on board remote test systems utilizing the invention. The test applications create the corresponding frame according to the applications specific requirements and objectives, and will provide the frame along with all necessary frame transmission requirements in terms of frame size, transmission rate, interframe gap specifications, frame fill pattern, transport protocol to be used, network layer precedence level, the required traffic modeling in terms of continuous versus Bursty traffic generation and any and all parameters in a predefined record of information, to the CSS 204 vis a vis operating system's queing interface 202.

The CSS in turn creates a test frame 300, illustrated in FIGS. 3A and 3B, and carries out all of the required processing and scheduling of the frame transmissions via the corresponding network services interface of the resident operating system. The resident kernels or the operating systems built-in transport and network layer protocol stacks (UDP/IP TCP/IP) in turn interface with the corresponding NIC card's driver module which takes care of the associated data link layer and interfaces directly to the physical medium.

The CSS prepares special test frames 300 that includes a packet header 302 containing protocol information, checksum, etc., the desired pay load 304 as dictated by the user-test application 200, and a TAG structure 306. With particular reference to FIG. 3B, the TAG structure 306 occupies the tail 56 bytes of the standard test frames, and includes various fields. The "source IP address" indicates the sender IP address. The "destination IP address", provides the destination IP address. The "scenario ID" field uniquely identifies the specific test scenario. The "Test-Cfg-ID" field uniquely identifies the specific configuration. The "Rx CSC-ID" field provides a receiving application identification. The "TX/Rx-Opcode" field tells the relevant driver of any specific actions to be performed. The "Sequence No." field is used for sequence tracking. The "Sequence No. Comp" is a compliment of the sequence number. The "one-way latency" field carries latency in ten nanosecond ticks that can be used for two-way latency measurements. The "Rx UTC Time"

field represents the receive UTC time in seconds. The "Rx UTC Comp" is a compliment of the receive UTC time in seconds. The "Rx UTC Frac" field represents the fractions past the seconds of the receive UTC time. The "RX UTC Frac Comp" field is a compliment of the above. The "TX UTC Time" field represents the transmit UTC time in seconds, and the "TX UTC Time Comp" is a compliment of this. The "Tx UTC Frac" field represents the fraction past the UTC transmit time seconds, and the "TX UTC Frac Comp" is its compliment. The fractional second portion described above contains a thirty-two bit value representing the amount of time past the seconds of the UTC time. The resolution of this field is set to forty nanosecond ticks, that can range from anywhere from ten nanoseconds and up to one hundred nanoseconds based on the frequency of a selected VCXO used on the TSE card, as described below.

A test frame is a custom-made frame with all the necessary components needed to support various aspects of online network monitoring applications. Frames of this type are sent from one apparatus to another apparatus for the purpose of latency, performance, through put, up time, QOS, reliability, integrity, sequence tracking and pay load verification measurements, etc. The test frames may carry any protocols ranging from pure IP to session-oriented protocol such as HTTP or TCP. The length of the frame may vary and be accommodated to user test application requirements.

The TAG structure 306, among other things, includes place holders, or fields, for transmit and receive time stamps (the RX UTC time to Tx Time Frac Comp. Frames) which are plugged in by the TSE when the test frame is on its way out onto the network wire, or in from the network wire, as will be described more particularly herein. The transmit and receive time stamp fields are also utilized as test frame signatures, and are assigned pre-determined values before transmission by the corresponding system software. These assigned values are compliments of each other and are neutral to test frame checksums placed in by the utilized protocol stacks. The corresponding system's software component schedules these test frames for transmission via the standard network interfaces as regular or standard frames.

Referring back to FIG. 2, all transmit (Tx) test frames 300 will travel down the protocol (UDP/TCP/IP) stack 206 where the frame is copied from the user space to the kernel space, and the necessary protocol processing is performed before delivering the frame to the appropriate device driver depending on the specific destination IP address. A specific piece of firmware, referred to herein as the Specialized Network Driver Module (SNDM), will distinguish test frames from non-test frames by detecting test frame signatures, or the TAG 306 portion of the test frame 300. An internal "op-code" embedded within the TAG portion of the test frame 306 can instruct the network driver firmware to perform certain required processing accordingly. Each "op-code" is predetermined between the controlling system software (CSS) and the driver and carries an instruction that tells the driver what service it has to provide to that specific test frame. The benefit of this approach is to be able to communicate with the firmware without any modification to the protocol stack.

The SNDM provides a collection of device drivers residing within the resident operating system's kernel modules. It provides the application software components and cooperating kernel modules an underlying architecture independent interface to the available network interface devices. This code consists of a set of self-contained and reentrant device driver codes implemented as kernel modules which operate independent of other kernel level modules and also of the user level application software run time environments. The SNDM consists of two independent logic paths, one dedicated to test frame transmit processing and one to frame receive processing.

Referencing again to FIG. 2, in transmit processing, the corresponding SNDM 208 will take action to distinguish true test frames from among others such as SNMP, ICMP, etc. frames traveling through the system. The SNDM will then perform some default and some specific actions based on whether or not the frame is identified as a true test frame with the TAG 306 occupying a portion of the test frame 300 located at the tail end thereof. As described above, the TAG fields containing the TX UTC seconds and its compliment, along with the TX UTC fractions field and its compliment are used as a sending test frame signature. The CSS presets these fields with temporary values accordingly, and the SNDM will check all frames for Tx test frame signature. If a signature match is found, then the frame is considered a valid test frame.

The SNDM performs two types of transmit test frame preprocessing for insertion of a time stamp received from the time stamp engine (TSE). The TSE is a self-contained hardware module with integrated GPS that maintains distributed synchronized accurate time information continuously, and without any external CPU intervention. The TSE card is designed with PCI interface and can operate on both 32 bits/33 MHz, and 64 bits/66 MHz-PCI bus slots. The reader will note that PCI bus allows bus master operations where I/O cards can DMA data to and from main memory access across the PCI bus with minimum latency in scatter/gather mode. Scatter/gather describes operations where data to be transmitted does not sit in contiguous address space, but in different memory regions that are pointed to by a buffer chain list. Similar operation can also be handled between two I/O cards.

The TSE card consists of a plug-in GPS receiver module and its antenna, a voltage control oscillator (VCXO) a 32-bit wide FIFO for use as a temporary holding place for save/retrieve of the address/snoop-data pairs for transmission coordination across the PCI bus, external antenna interface, external peripheral bus (PCI) interface for communications to and from the host CPU on the main-board and the corresponding I/O peripherals such as the NIC cards, and a Field Programmable Gate Array (FPGA) hosting all the necessary logic including: the PCI initiator and target bridge for multi-master operation PCI bus snooping, two FIFO's (Tx/Rx) to facilitate the communication to and from the GPS interface, the time synchronization, and time stamp logic.

The GPS delivers a 1-PPS clock signal with an accuracy close to plus or minus fifty nanoseconds compared to true UTC time. In parallel with this highly accurate clock, an onboard 25 MHz voltage controlled oscillator (VCXO) delivers forty nanosecond time ticks to a counter. The output of this counter is compared with the value of "250,000,000/forty" (number of forty nanosecond time ticks in one second) each time a 1-PPS pulse from the GPS is detected. The result feeds a digital to analog converter (DAC) that is used to adjust the tension of the VCXO. This allows compensating for any clock drifts on a per second basis. When the result is positive or negative (the VCXO is in late or advance), the content of DAC is preset to a larger or lower value that is used to adjust the observed delay to zero. The fabricated clock is then tracking the phase and frequency of the 1-PPS pulse coming from the GPS and maintains then an internal clock that delivers sub-PPS pulses.

The CSS running on board the host CPU will initialize the TSE with the accurate UTC time. The TSE will latch in a register the UTC time and will use its internal clock to continue and keep track of the UTC time internally. The TSE will use the 1-PPS signal from the onboard GPS to prevent its internal clock from skewing. Since the received 1-PPS signals from the GPS can fluctuate due to a number of external factors such as the total number of viewable satellites which the GPS can maintain synchronization with, atmospheric conditions, internal GPS noise and antenna delays, the TSE before acting on a received 1-PPS uses an averaging mechanism to smooth out the received 1-PPS signals from the GPS. It will be noted by the reader that the TSE card can be equipped with an improved VCXO, such as a 100 MHz VCXO, thus yielding ten nanosecond tick resolution. Accordingly, the resolution of the present invention can be improved as the technology of the various component parts thereof are improved. The theoretical error tolerance of time stamps is less than two ticks. The margin of error in terms of accurate synchronized UTC time keeping among a group of cooperating and synchronized remote TSE cards does not exceed two ticks. This provides a total error or margin of no more than plus or minus four ticks.

The TSE takes an initial UTC time configuration from the CSS at power on. After that point on, the TSE keeps track of the one second/fractions counter internally using the 1-PPS signals from the GPS receiver. The TSE performs the processing necessary to provide a sixteen bytes readable contiguous locations for maintaining the time stamp in real time in UTC. The first long word (LW) of the time stamp (TS) will contain the UTC time in seconds. The second LW will contain the compliment of the first LW, the third LW will contain the fractional portion past the last second of the UTC time, in forty nanosecond ticks and the last LW will contain the compliment of the third LW on the fly. The compliments provide protocol checksum neutrality.

The TSE also provides a control register for use by the CSS. This register is 32 bits long and includes predefined settings. Upon a read from the first register (the UTC seconds counter) the TSE latches the complete set of the time stamp registers into a temporary holding place. In this manner, a consistent set of UTC time stamp with the corresponding compliments are then available for either the SNDM or peripheral I/O cards such as a NIC card to fetch the TS on the fly for insertion into the outgoing frames. For time stamp insertion the SNDM can either directly access the TS registers as memory mapped registers within the reserve PCI shared memory address space on board the TSE card or configure the transmit mechanism of the peripheral I/O cards, such as off-the-shelf NIC cards, to access the TS registers directly via PCI, bypassing the host PCI bridge on-board the main CPU board using the actual physical addresses assigned to them at system power up time.

Thus, the SNDM 208, as illustrated in FIG. 2, after verifying the test frame signature, sets up the frame for time stamp insertion before enqueing the reference to time buffer onto corresponding NIC card queue. As described above, the TAG portion of the test frame 306 includes an internal "op-code" embedded therein which instructs the SNDM what service it has to provide to that specific test frame. Such op-codes, among other things, instruct the driver to: (1) chain in the transmit time stamp register located on board the TSE hardware to the test frame on its way out; (2) retrieve the contents of the time stamp register set from the TSE card and insert them directly inside the test frame TAG and transmit it as one whole frame; (3) provide the transmit time stamps in absence of the TSE hardware from the computer's real time clock; (4) on receive, plug the receive time stamp provided by the TSE hardware into the corresponding reserved locations inside the frame TAG structure; (5) perform round trip delay calculation; and (6) skip time stamp processing and forward the frame as it is.

If the corresponding NIC card 210 is capable of scatter/gather DMA, that is a frame can reside in multiple buffers 212–218, as illustrated in FIG. 2, then the SNDM will perform the processing necessary to reduce the transmit frame size by sixteen bytes (the size of the transmit TS), and chain in a new transmit descriptor pointing at the TS register set on board the TSE card. Doing so creates two chained buffers. In the next stage, the SNDM queues the frame for transmission onto the NIC cards transmit queue. In this manner, the TS register set contents on board the TSE card will get read "on the fly" as the frame is being transmitted out by the NIC card 210. This method of TS insertion will produce minimum TS jitter.

However, if the NIC card 210 is not capable of scatter/gather DMA, that is a transmit frame must reside in a single buffer consisting of contiguous memory locations, then the SNDM will directly read the contents of TS register set on board the TSE card across the PCI bus, and will plug them into their corresponding locations inside the TAG portion 306 of the outgoing frame 300. It then will enqueue the frame onto the corresponding NIC cards transmit queue.

Thus, with reference now to FIG. 4, in order to transmit a test frame in accordance with the present invention, the test application prepares and submits frame transmit requirements (400). The test frame is then prepared with the required TAG (402). The test frame passes through the protocol stack and operating system (404) reaching NIC's driver where the SNDM checks for test frame signature. If this is found, a new descriptor for time stamp data to be fetched from the TSE card is chained in the appropriate location, otherwise the frame is sent as is onto the network interface card (406 and 408). Those skilled in the art will appreciate that this process is performed with minimal use of the operating system or CPU. Also, the time stamp data from the TSE card is inserted into the reserved transmit time stamp fields at nearly the instant that the tail of the test frame is sent onto the network.

The test frame is sent over the network wire until it is properly routed to the receiving computer having the same components as that described above, namely, a TSE, SNDM firmware, CSS software, and the relevant user test applications. With reference to FIG. 5, upon receipt by the network interface card 500 of the receiving computer, the TSE receive side processing performs transparent bus snooping to detect start or end of frame transmission across the PCI by any of the NIC cards. If the TSE finds a frame start address, a receive time stamp is written into the head of the receive buffer 502. This process is referred to as an address match mode. The frame is then checked by the SNDM for test frame signature, that is that it has the appropriate TAG portion. If this is found, the received time stamp is copied from the head of the frame into the reserved TAG area, namely the Rx fields and compliments thereof 504. Thus, all received test frames are written onto receive buffers located on the host CPU mother board. The TSE card stores the received time stamps onto the reserved portion of all received frames.

The SNDM will then take action, as described above, to distinguish true test frames from among others such as SNMP, ICMP, etc. being received from the network at the driver level. The SNDM will then perform default and specific actions, including the copying of the received time stamp, based on whether or not a received frame is identified as a true test frame. The TAG fields containing the TX UTC seconds and its compliment, along with the TX UTC fractions field and its compliment are used as receive test frame signature. The SNDM will also check all frames for Rx test frames signature. If a signature match is found, then the frame is considered a valid test frame. After the SNDM performs the processing necessary to plug the Rx time stamps into the corresponding fields within the TAG portion of the received frame, the frame will be passed through the normal processing section of the driver and through the protocol stack and operating system 506, where the received test frame is submitted to the specified test applications 508. The test application then performs the required statistics processing and data collection 510, the process being essentially the reverse flow of logic illustrated in FIG. 2. All non test frames pass through the standard receive frame processing section of the SNDM and are not typically submitted to the test applications.

Figure 6:
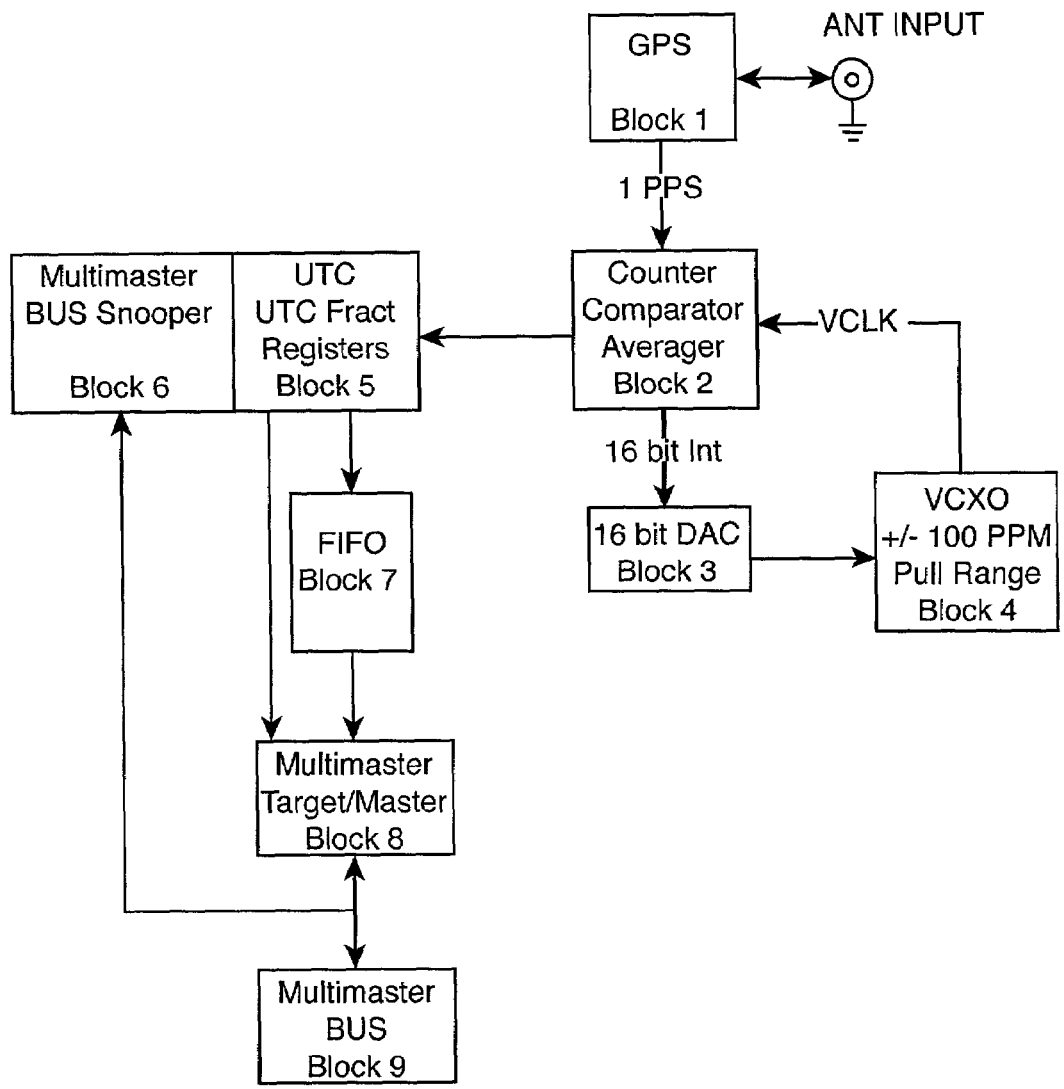
FIG. 6 is a functional block diagram depicting the steps of time stamping a received test frame in accordance with the present invention.

Referring now to FIG. 6, an application example using the TSE to TAG snoop packets on a PCI bus with special time stamp values is illustrated. A GPS receiver in Block 1 locks onto orbiting satellites using its antenna input to achieve accurate time and position. An accurate 1-PPS signal is sent from the GPS receiver to a counter-comparator-averager in Block 2. The counter-comparator-averager will monitor the 1-PPS pulse and use a high speed counter to check the location of the 1-PPS pulse relative to where the count happens to be. The relative offset of the counter to the 1-PPS will force an error signal through a digital-to-analog (DAC) converter in Block 3 which converts the error to an analog voltage to control a voltage controlled crystal oscillator (VCXO) in Block 4 that generates the frequency for the counter in Block 2. The count offsets are averaged over time to generate the error correction values.

The counter-comparator-averager is accessible by registers that are latched to and keep track of the UTC and fractional seconds and their compliments, in Block 5. For receive time stamp insertion, the TSE latches the internal UTC time counters upon detection of the start of the new frame transferred across the PCI bus to the host RAM, and saves the time stamp values along with the detected frames buffer address onto an internal FIFO, shown in Block 7. The FIFO is a 64 bit wide FIFO that holds 32 bit address locations and 32 bit time stamp data to be written onto the bus.

The detection of the start of a new frame transfer across the PCI bus is performed by the multi-master BUS snooper, illustrated in Block 6. The multi-master BUS snooper may have one of two modes, namely, address or pattern match mode. In the address mode, the logic continuously monitors the bus passively, a particular address being defined to be the start of a packet location. If the start of a packet location address is seen on the bus, the logic latches the UTC and fractional timers and place it into the FIFO, Block 7, with the appropriate receive buffer address of the frame. The multi-master target/master Block 8, upon seeing the values in the FIFO, will transfer these values using the defined addresses that coincide with the data in the same FIFO. The master-target device, in master mode, will monitor the FIFO Block 7 condition, and if it detects any contents in the FIFO will initiate master write cycles. In target mode, the host processor will initiate read or write to cycles and the target mode will detect these cycles and transfer the time stamp values or any other registered values onto the bus. Block 9 represents a multi-master bus, such as the PCI 32 bit, 33 MHz bus in this example. Note that if the master-target device of Block 8 detects the host processor wanting to read the four time stamp registers, it will latch the UTC and fractional counters and their compliments into the time stamp read registers.

In the pattern match mode, the logic continuously monitors the bus passively and looks at the contents at an address location and the content of the next contiguous address location. If the values are compliments of each other in the four contiguous word address locations, a pre-defined address will be generated which would be some function of the contiguous snooped addresses and the UTC and fractional fields within the TAG. The derived address will be latched and written into the FIFO Block 7. If the subsequent address is snooped are not contiguous, the active thread is stored away or saved. The thread is reactivated when contiguous word address locations are seen again. Then the stored contents will be retrieved and the search process will continue until all four word addresses are deciphered. If the values were the compliments of each other then the time stamps will be latched into a register set and written onto FIFO Block 7 with the appropriate addresses which would be a function of the snooped contiguous addresses that a snoop hit was achieved. If the values of the contiguous addresses are not compliments of each other, the particular active thread is reset and uses the last long word as its initial value. Any number of active threads can be activated depending upon the memory allocated in the system.

In either method the TSE received processing is independent of the number of I/O cards operating on the PCI bus, and the speed of the time stamping operations is not limited by the through put of the PCI bus. The receive TS FIFO components operate independent of the rest of the TSE, and upon existence of valid data in the FIFO, it starts processing by first issuing a request for the PCI bus, and upon grant it fetches the time stamp/address pair, and starts a PCI transfer to the target address located on the host RAM within the receive frame buffer reserved area.

Figure 7:
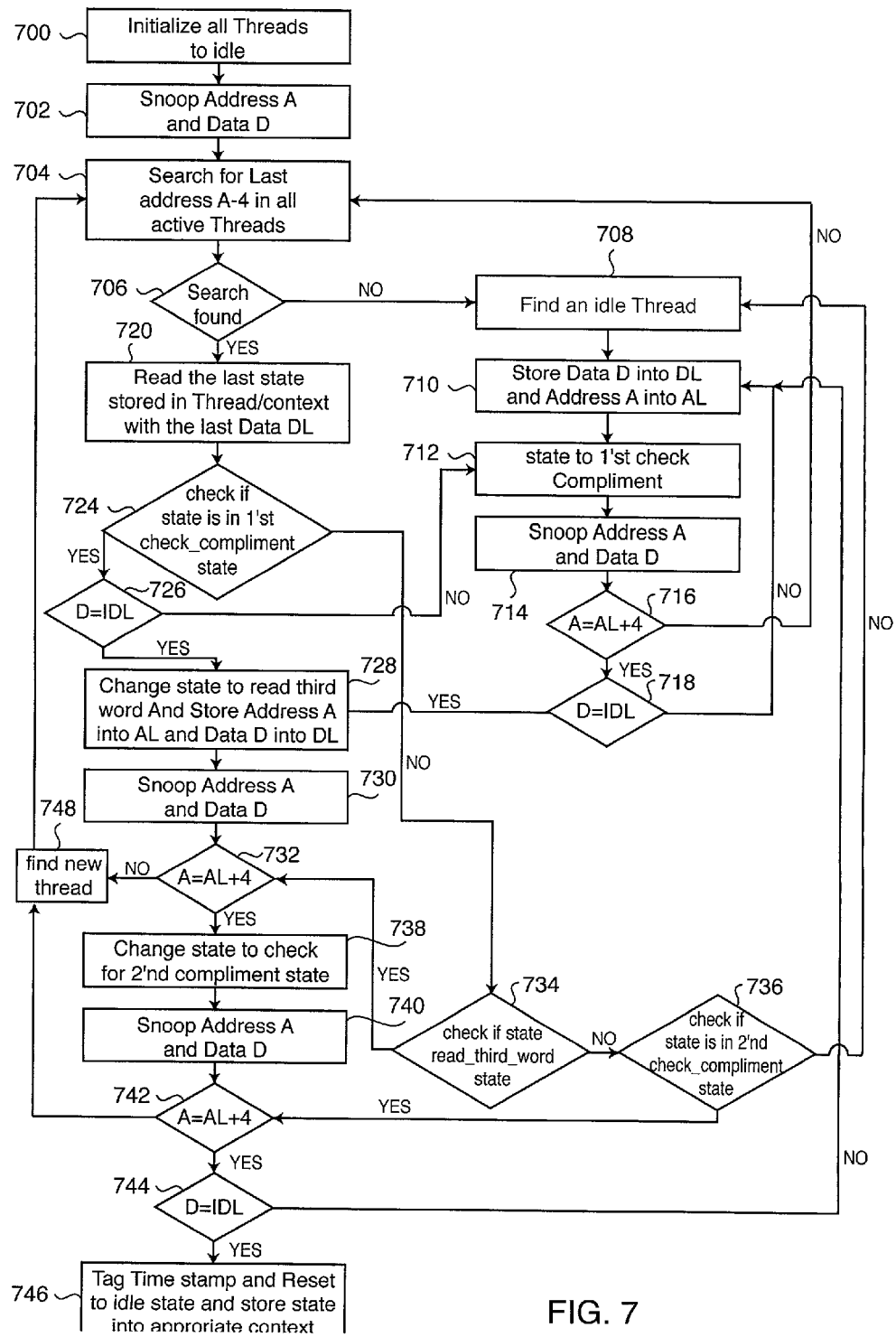
FIG. 7 is a flow chart depicting the steps taken in recognizing a test frame produced in accordance with the present invention, and appending a received time stamp thereto.

With reference now to FIG. 7, a flow chart of the pattern mode bus snoop is illustrated according to a preferred method. First, all threads are initialized to idle 700. The 32 bit data "D", and the present address "A" are snooped 702. The last address "A−4" and all active threads is then searched to determine if the present address is a continuation 704. The search result is then checked 706, and if not found, proceeds to find an idle thread at step 708. However, if it is found, then it proceeds to read the last state stored within the thread/context with the last data. After finding an idle thread 708, the data "D" is stored into "DL" (data last) and address "A" into "AL" (address last) 710. The state of the thread (state machine) has been changed to "first check compliment state" 712.

The present address and 32 bit data are then snooped 714 and it is determined whether the present address "A" is equal to the previous address "AL +4" 716. If it is not, the process returns to step 704. If it is, it is determined whether the 32 bit data equals the compliment of the 32 bit last data inverted 718. If it is not, the process returns to step 710. If it is, the process proceeds to step 728 where the state of the thread is changed to "read third long word" state, and present address is stored into the previous address "AL" and data "D" into the inverted data "DL".

If the search was found in step 706, the last state stored in the thread is read with the last data "DL" 720. It is then checked if thread is in the "first check compliment state" 724. If it is, the logic proceeds to step 728. If it is not, the logic proceeds to step 712. The bus is then snooped for the next address data pairs, and latches them into the present address and 32 bit data, step 730. If the present address equals the previous address plus four, in step 732, the state is changed to "second check compliment" state and step 738. If not, a new thread is found in step 748.

In step 734, the current thread is checked to see if it is in the "read third long word" state. If it is, it proceeds to step 732. If not, it proceeds to step 736 where it is checked to see if the thread is in the "second check compliment" state. If it is, it proceeds to step 742 to determine if the present address equals the previous address plus four. If it is not, it reverts to step 708. Proceeding from step 738, the next data address pair on the bus is snooped 740, and it is determined whether the present address equals the previous address plus four in step 742. If it does not, it proceeds to find a new thread 748, however, if it is, the logic determines whether the 32 bit data is equal to the 32 bit last data inverted in step 744. If it is not, the logic reverts to step 710. If it is, a time stamp is latched and stored into the designated fields within the TAG portion of the test frame at step 746, and the thread state is reset to an idle state.

Figure 8:
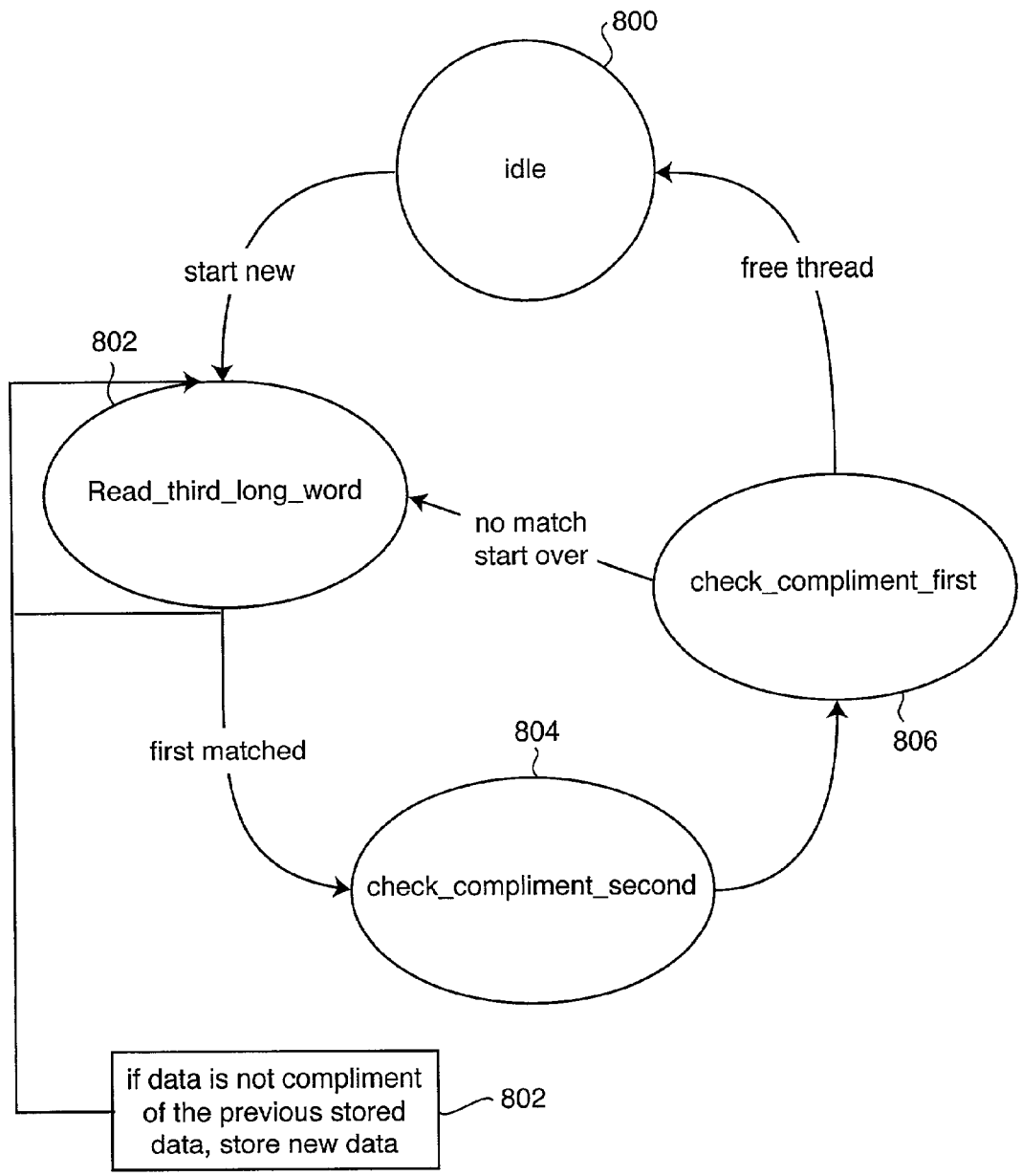
FIG. 8 is a diagram depicting a method of recognizing received test frames in accordance with the present invention.

Referring now to FIG. 8, an operation of a single thread (a.k.a. state machine) according to the pattern mode is depicted. The operation begins in an idle state 800, and upon receipt of data, the thread enters into the "check compliment first" state 802. The current address and data are saved as the last address and data. New address data pairs are snooped. The new address is compared with the last address, and if the new address is not the next contiguous address location, then a new matching thread is started. Otherwise, the new data is compared to the last data. If the new data is the compliment of the last data, then the logic proceeds to the "read third long word" state 804. Otherwise, the current address/data pairs are stored as the last address/data and remain in the current state. In the "read third long word" state, new address data pairs are snooped and saved as last address and data. The logic then proceeds to the "check compliment second state" 806 in which new address data pairs are snooped. The new address is compared with the last address, and if the new address is not the next contiguous address location, then the address/data pairs are stored as the last address/data pair and go to the "check compliment first" state 802. Otherwise, the new data is compared to the last data. If the new data is the compliment of the last data, then the logic has found a valid test frame signature and the time stamp can be latched and stored into the TAG of the frame, and the free thread initialized to idle.

Although rather detailed software logic has been provided in FIGS. 7 and 8 as an illustration of the preferred method of finding the true test frames received by locating the "signature" or performing a pattern match of the TAG portion of the test frames, it should be understood that the invention could conceivably utilize other methods of recognizing true test frames and discerning these from other frames received by the receiving computer.

It will be readily understood by one skilled in the art that the present invention provides many benefits. Due to the fact that the time stamps are appended on the "fly", CPU time in transmit mode is minimized. CPU time is also minimized in the receive mode as all time stamps are appended transparently without CPU intervention, which is not the case for software related time stamping techniques where an interrupt has to be generated for each receive time frame in order to read system time and to append the system time to the receive frame. The use of the present invention maintains a very high accuracy independent of the operating system, and achieves high performances that are independent of the network and the CPU. The invention works in conjunction with other local transmitting entities that request transmission of legacy frames that don't carry time stamping information. Due to the fact that the inserted transmit time stamp of a frame represents the UTC time when the last bit of the frame is shifted out onto the outgoing wire, and the time stamp carries the value of the time when the last bit of the frame is shifted in on receive frames, highly accurate timing measurement services are realized with the resolution of between ten and one hundred nanosecond ticks plus/minus two ticks.

Although several embodiments of the present invention have been described in detail for purposes of illustration, various modifications of each may be made without departing from the spirit and scope of the invention. Accordingly, the invention is not to be limited, except as by the appended claims.

What is claimed is:

1. A method for creating accurate time-stamped frames sent between computers via a network, comprising the steps of:
receiving a universal coordinated time reference signal;
synchronizing clocks electronically connected to universal coordinated time reference signal receivers and associated with sending and receiving computers, but operating independently of operating system clocks of the sending or receiving computers, with the universal coordinated time reference signal by initializing the clocks with the received universal coordinated time reference signal;
using the clocks to create sub-microsecond time values corresponding to a fractionalized universal coordinated time reference signal;
over time, adjusting the clock into synchronization with the universal coordinated time reference signal;
creating a test frame including a tag having reserved fields for transmit and receive time stamps representing the universal coordinated time reference signal and the sub-microsecond time values;
inserting a transmit time stamp into the reserved transmit time stamp field corresponding to the time on the synchronized clock of the sending computer at the instant the test frame is sent onto the network without intervention of the sending computer's central processing unit; and
receiving the test frame having the transmit time stamp and inserting a receive time stamp into the reserved receive time stamp field corresponding to the time on the synchronized clock of the receiving computer when the test frame was received by the receiving computer.

2. The method of claim 1, wherein the universal coordinated time signal is received via a global positioning system receiver.

3. The method of claim 2, wherein the clock and global positioning system receiver are electronically connected on a device which is attachable to an existing multi-master bus of either the sending or receiving computer.

4. The method of claim 3, wherein the device comprises a card interfacing with a multi-master bus of the receiving or sending computer.

5. The method of claim 1, wherein the adjusting step includes the steps of altering the voltage applied to a voltage controlled crystal oscillator associated with the clock to maintain synchronization with the universal coordinated time signal.

6. The method of claim 1, wherein a receiving device, without intervention from the receiving computer, automatically attaches a receive time stamp corresponding to the synchronized time that the frame was received for each frame received.

7. The method of claim 1, wherein a receiving device, without intervention from the receiving computer, detects the tag of each test frame and attaches a receive time stamp corresponding to the synchronized time that the frame was received to only the test frames.

8. The method of claim 1, wherein the creating step includes the step of creating complimentary time information in the reserved transmit and receive time stamp fields to enable the insertion of the synchronized transmit and receive time stamps upon transmit and receipt, respectively, in order to preserve an original TCP or UDP checksum.

9. The method of claim 1, wherein the synchronized clocks have a resolution of between 10 and 100 nanoseconds.

10. A method for creating accurate time-stamped frames sent between computers via a network, comprising the steps of:
   using a global positioning receiver in communication with sending and receiving computers to generate a universal coordinated time reference signal;
   synchronizing clocks associated with the sending and receiving computers, but operating independently of operating system clocks of the sending or receiving computers, with the universal coordinated time reference signal by initializing the clocks with the received universal coordinated time reference signal and over time tracking and averaging the periodically received universal coordinated time reference signal and adjusting the clock to correspond to the universal coordinated time reference signal by altering the voltage applied to a voltage controlled crystal oscillator associated with the clock;
   creating a test frame including a tag having reserved fields for transmit and receive time stamps;
   creating complimentary time information in the reserved transmit and receive time stamp fields;
   replacing the complimentary time information in the transmit time stamp field with a transmit time stamp corresponding to the time on the synchronized clock of the sending computer at the instant the test frame is sent onto the network without intervention of the sending computer's central processing unit; and
   automatically attaching a receive time stamp corresponding to the time on the synchronized clock of the receiving computer when the frame was received by the receiving computer to every frame received by the receiving computer.

11. The method of claim 10, wherein the clock and global positioning system receivers are electronically connected on a device which is attachable to an existing multi-master bus of either the sending or receiving computer.

12. The method of claim 11, wherein the device comprises a card interfacing with a multi-master bus of the receiving or sending computer.

13. The method of claim 10, wherein the synchronized clocks have a resolution of between 10 and 100 nanoseconds.

14. The method of claim 1, wherein the inserting step includes inserting the transit time stamp into the reserved transit time stamp field at the instant a last byte of the test frame is sent onto the network; and wherein the receiving step includes the step of inserting a receive time stamp into the reserved receive time stamp field when a first byte of the test frame is received by the receiving computer.

15. The method of claim 3, wherein the device includes only hardware or firmware and not software.

16. The method of claim 5, wherein the adjusting step comprises the steps of comparing the received universal coordinated time reference signal with the created sub-microsecond time values and altering the voltage applied to the voltage controlled crystal oscillator associated with the clock to speed up or slow down and synchronize the sub-microsecond time values created by a counter in the clock with the universal coordinated time reference signal.

17. A method for creating accurate time-stamped frames to be sent between computers via a network, comprising the steps of:
   receiving a universal coordinated time reference signal;
   creating sub-microsecond time values corresponding to a fractionalized universal coordinated time reference signal using a clock operating independently of a computer clock and in direct electronic communication with a universal coordinated time reference signal receiver, wherein the universal coordinated time reference signal and the sub-microsecond time values together represent an absolute time;
   over time, comparing the received universal coordinated time reference signal and the created sub-microsecond time values and adjusting the clock into synchronization with the universal coordinated time reference signal;
   creating a test frame including a tag having reserved fields for transmit and receive time stamps representing the absolute time; and
   inserting a transmit time stamp into the reserved transmit time stamp field corresponding to the absolute time the test frame is sent onto the network, without intervention of the computer's central processing unit.

18. The method of claim 17, wherein the universal coordinated time signal is received via a global positioning system receiver.

19. The method of claim 16, wherein the clock and global positioning system receiver are electronically connected on a device which is attachable to an existing multi-master bus of either the sending or receiving computer.

20. The method of claim 19, wherein the device comprises a card interfacing with a multi-master bus of the receiving or sending computer.

21. The method of claim 20, wherein the device includes only hardware or firmware and not software.

22. The method of claim 21, wherein the device does not consume any of the computer's central processing resources.

23. The method of claim 17, wherein the adjusting step includes the steps of altering the voltage applied to a voltage controlled crystal oscillator associated with the clock to speed up or slow down and synchronize the sub-microsecond time values created by a counter in the clock with the universal coordinated time reference signal.

24. The method of claim 17, wherein the clock has a resolution of between 10 and 100 nanoseconds.

25. The method of claim 17, including the step of receiving the test frame having the transmit time stamp and inserting a receive time stamp into the reserved receive time stamp field corresponding to the time on the synchronized clock of a receiving computer when the test frame was received by the receiving computer.

26. The method of claim 24, wherein the receiving computer automatically attaches a receive time stamp corresponding to the synchronized time that a first byte of the frame was received for each frame received.

27. The method of claim 24, wherein the receiving computer detects the tag of each test frame and attaches a receive time stamp corresponding to the synchronized time that the frame was received to only the test frames.

28. The method of claim 24, wherein the creating step includes the step of creating complimentary time information in the reserved transmit and receive time stamp fields to enable the insertion of the synchronized transmit and receive time stamps upon transmit and receipt, respectively, in order to preserve an original TCP or UDP checksum.

* * * * *